United States Patent [19]

Dahm

[11] Patent Number: 4,702,727
[45] Date of Patent: Oct. 27, 1987

[54] TENSIONING DEVICE

[75] Inventor: Wolfram Dahm, Nuertingen, Fed. Rep. of Germany

[73] Assignee: Daimler-Benz Aktiengesellschaft, Stuttgart, Fed. Rep. of Germany

[21] Appl. No.: 894,876

[22] Filed: Aug. 8, 1986

[30] Foreign Application Priority Data

Aug. 8, 1985 [DE] Fed. Rep. of Germany ....... 3528442

[51] Int. Cl.$^4$ .............................................. F16H 7/08
[52] U.S. Cl. .................................... 474/101; 474/135
[58] Field of Search ................................ 474/101–103, 474/110, 133, 135

[56] References Cited

U.S. PATENT DOCUMENTS

| | | | |
|---|---|---|---|
| 4,276,038 | 6/1981 | Kraft | 474/110 |
| 4,464,146 | 8/1984 | Arthur | 474/135 X |
| 4,473,362 | 9/1984 | Thomey et al. | 474/133 X |
| 4,583,962 | 4/1986 | Bytzek et al. | 474/133 |

FOREIGN PATENT DOCUMENTS 0072134 2/1983 European Pat. Off. .

Primary Examiner—Stephen J. Novosad
Assistant Examiner—Thuy M. Bui

[57] ABSTRACT

A tensioning device for a belt drive, especially for a V-belt drive for the drive of aggregates of an engine such as an internal combustion engine, with a fixed member and a member rotatable with respect thereto and carrying a tensioning roller resting against a belt, whereby a spring as well as a damping device having a damping force dependent on the operating condition which presses the tensioning roller against the belt, acts between the fixed and the rotatable part. In order to prevent a belt fluttering and a belt slippage in a defined manner, an additional damping device is provided between the rotatable and the fixed member or the engine which is controllable as a function of one or several operating parameters of the belt drive and/or of the engine and is operable only at certain values of these operating parameters.

14 Claims, 3 Drawing Figures

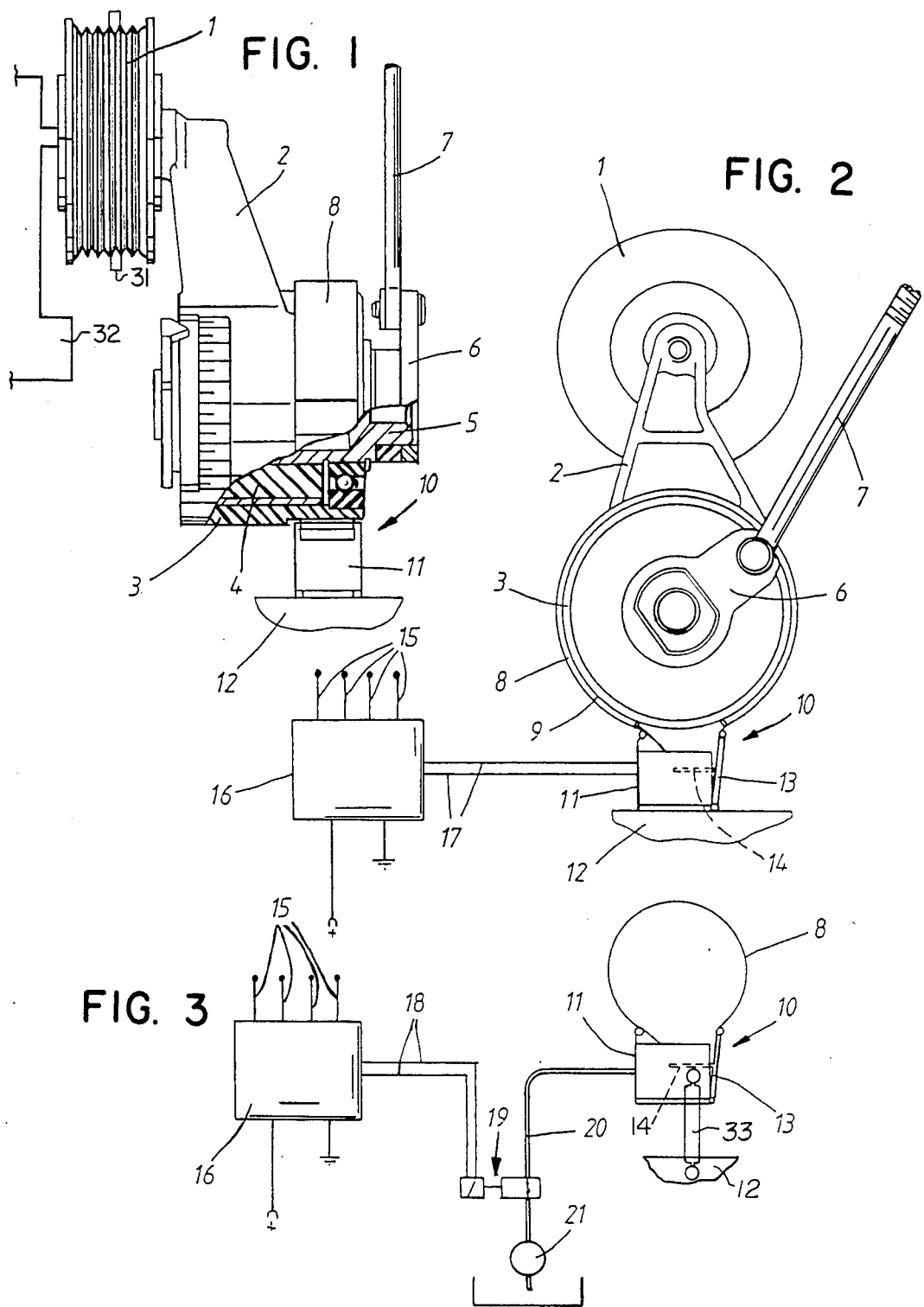

TENSIONING DEVICE

The present invention relates to a tensioning device for a belt drive, especially for a V-belt drive, for driving aggregates of an engine such as an internal combustion engine, with a fixed part and with a part rotatable with respect thereto and carrying a tensioning roller abutting against the belt, and in which a spring pressing the tensioning roller against the belt as well as a damping device having a damping force depending on the operating condition act between the fixed and the rotatable parts.

Such a tensioning device is disclosed in the DE-OS No. 32 25 411. In this known tensioning device, bushing-shaped damping bodies of yielding material are provided between the fixed and the rotatable part which are intended to produce a damping force dependent on the movement between the two parts. However, it has been found in practice that such damping bodies can produce a damping force which is far too small for damping the movements of the tensioning roller and of the belt. Additionally, the damping force can be varied only little so that it can be hardly used in a specific aimed-at manner under certain operating conditions during which the danger of the occurrence of the belt fluttering is particularly great or during which the belt fluttering can have considerable harmful effects.

The present invention is concerned with the task to provide a tensioning device with a damping device which dampens intentionally at certain operating conditions of the engine and of the belt drive vibrations within the belt drive and thereby renders the vibrations ineffectual.

The underlying problems are solved according to the present in invention in that an additional damping device is provided between the rotatable part and the fixed part or the engine which is adapted to be controlled as a function of one or several operating parameters of the belt drive and/or of the engine and is effective only at certain values of these operating parameters.

It is possible with the tensioning device constructed in accordance with the present invention to produce a large damping force exactly when the danger of the belt fluttering is great or when the belt fluttering can have particularly dangerous effects whereas under other operating conditions, the additional damping device is inoperable. The strong load of the belt drive by the additional damping device as also a rigid behavior of the tensioning roller is thus limited to the necessary, relatively short periods of time.

According to another feature of the present invention, the magnitude of the damping force of the damping device is dependent on the value of the operating parameter up to the point of stopping the rotatable part with respect to the fixed part or the engine. This construction of the tensioning device in accordance with the present invention enables a good matching of the damping force to the necessity of the damping without loading the belt drive beyond the absolutely necessary.

According to a further feature of the present invention, the operating parameter may be the rotational speed, especially during the starting and acceleration phase of the engine and/or the temperature within the area of the belt drive and/or the deflection of the tnesioning roller, respectively of the belt. Individual or several operating parameters which are determinative for the belt fluttering and the belt slippage or which indicate the same, can thus be utilized for the control of the damping device in accordance with the present invention.

Particularly simple and effective ways of actuating the damping device can be obtained according to this invention if the actuation of the damping device takes place electrically, hydraulically or pneumatically.

According to another feature of the present invention, the damping device is constructed as a tensioning band looping around the rotatable part and provided on its inside with a friction layer and as a tensioning element which introduces at the ends of the tensioning band the tensioning force to be produced for the tensioning thereof. Such an arrangement according to the present invention represents a damping device that can be manufactured in a simple manner and that can produce the damping forces of any desired magnitude up to the stopping of the rotatable part.

According to still another object of the present invention, the tensioning element may be secured at the housing of the engine or at a shock absorber provided between this housing and the rotatable part. Particularly favorable ways of fastening the tensioning element are obtained in this manner, whereby the fastening at the shock absorber brings about a further improved damping action by the series connection of two dampers.

These and other objects, features and advantages of the present invention will become more apparent from the following description when taken in conjunction with the accompanying drawing which shows, for purposes of illustration only, two embodiments in accordance with the present invention, and wherein:

FIG. 1 is a longitudinal elevational view of a tensioning device in accordance with the present invention, partly in cross section;

FIG. 2 is a side elevational view of the tensioning device of FIG. 1 with a schematic showing of an electrical actuating mechanism; and FIG. 3 is a schematic illustration, similar to FIG. 2, with a hydraulic, respectively, pneumatic actuating mechanism in accordance with the present invention.

Referring now to the drawing wherein like reference numerals are used throughout the various views to designate like parts, a tensioning roller 1 which prestresses a V-belt 31 (schematically shown) for the drive of aggregates of an internal combustion engine 32, is rotatably supported on a tensioning arm 2 which is rigidly connected with a rotatable part 3. The rotatable part 3 surrounds under interposition of an elastic bushing-shaped member 4 which serves as spring and damping element, a fixed member 5 which is supported by way of a lever 6 on a rod 7 serving for the adjustment of the prestress between the rotatable member 3 and the fixed member 5.

In order to prevent excessively large movements of the tensioning roller 1 and therewith a fluttering and slippage of the belt, an additional damping device is provided adjacent the elastic member 4. The additional damping device essentially consists of a tensioning band 8 surrounding the rotatable member 3, which has a friction layer 9 on the side thereof facing the rotatable member 3 and of a tensioning element generally designated by reference numeral 10. A lever 13 (FIG. 2) is pivotally connected at the housing 11 of the tensioning element 10; the housing 11, in turn, is secured at the illustrated housing 12 of the internal combustion engine, or a shock absorber means 33 connected between the housing 12 and the housing 11 of the portable member 3 (FIG. 3) whereby a lever force can be exerted on the lever 13 by a rod 14 of the tensioning element 10. The two circumferential ends of the tensioning band 8 are secured, on the one hand, at the housing 11, and, on the other, at the free end of the lever 13 of the tensioning element 10. By a more or less strong attraction of the rod 14 and therewith of the lever 13, the tensioning band 8 can exert a friction force on the rotatable member 3, as a result of which a rotary movement of the rotatable member 3 and therewith a pivot movement of the tensioning roller are damped. By a correspondingly strong prestressing of the tensioning band 8, the rotatable member 3 and the tensioning roller 1 can be stopped, i.e. fixed. A belt fluttering is suppressed in a desired manner by means of the damping of the pivot movement of the tensioning roller 1.

The actuation of the rod 14 can take place, as illustrated in FIG. 2, in an electrical manner. For that purpose, operating parameters of the internal combustion engine or of the belt drive which may trigger the belt fluttering or which are a consequence of the belt fluttering, such as rotational speed and especially the starting operation of the internal combustion engine, the temperature of the belt drive or the deflection of the tensionig arm 2 are fed by way of electric lines 15 to a computer 16 which transmits as a function of the values of the operating parameters an electrical signal to the tensioning element 10 by way of lines 17, whereby the signal actuates the rod 14, and the strength of the actuating force is dependent on the magnitude of the electrical signal.

As shown in FIG. 3, the actuation of the rod 14 can also take place in a hydraulic or pneumatic manner. For that purpose, electric lines 18 lead to a control device 19 connected in a hydraulic, respectively, pneumatic line 20 between a pump 21 and the tensioning element 10. The pressure in the line 20 and therewith the forces exerted on the rod 14 and on the tensioning band 8 are adjusted as a function of the magnitude of the electrical signal of the lines 18.

While I have shown and described only two embodiments in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are encompassed by the scope of the appended claims.

I claim:

1. A tensioning device for a belt drive on an engine, comprising a fixed member, a rotatable member rotatable with respect to the fixed member and carrying a tensioning roller means operable to rest against a belt, spring means and damping means having a damping force dependent on the operating condition operatively connected between the fixed and the rotatable member, and additional damping means between the rotatable member and one of the fixed member and the engine, said additional damping means being controllable in dependence of at least one operating parameter and being operable to apply a damping effect throughout all ranges of tensioning activity of the tensioning roller means only at certain values of said operation parameter.

2. A tensioning device according to claim 1, wherein the belt drive is a V-belt drive for the drive of aggregates of an engine.

3. A tensioning device according to claim 1, wherein said additional damping means is controllable as a function of several operating parameters of one of belt drive and engine.

4. A tensioning device according to claim 1, wherein the magnitude of the damping force of the additional damping means is dependent on the value of the operating parameter up to fixing the rotatable member with respect to the fixed member.

5. A tensioning device according to claim 4, wherein the operating parameter is at least one of rotational speed, temperature within the area of the belt drive and deflection of the tensioning roller means, respectively belt.

6. A tensioning device according to claim 5, wherein the operating parameter is the rotational speed during the starting and acceleration phase of the engine.

7. A tensioning device according to claim 5, wherein the actuation of the additional damping means takes place electrically, hydraulically or pneumatically.

8. A tensioning device, for a belt drive, on an engine comprising a fixed member, a rotatable member rotatable with respect to the fixed member and carrying a tensioning roller means operable to rest against a belt, spring means and damping means having a damping force dependent on the operating condition operatively connected between the fixed and the rotatable member, and additional damping means between the rotatable member and one of the fixed member and the engine, said additional damping means being controllable in dependence of at least one operating parameter of rotational speed, temperature within the area of the belt drive and deflection of the tensioning roller means, respectively belt and being operable only at certain values of said operating parameter and with the magnitude of the damping force of the additional damping means being dependent on the value of the operating parameter up to fixing the rotatable member with respect to the fixed member, the actuation of the additional damping means taking place electrically, hydraulically or pneumatically, and wherein the additional damping means is constructed as a tensioning band means and a tensioning element, said tensioning band means surrounding the rotatable member and being provided on its inside with a friction layer and said tensioning element introducing at the ends of the tensioning band means tensioning forces necessary for the tensioning thereof.

9. A tensioning device according to claim 8, wherein the tensioning element is secured at one of a housing of the engine or a shock absorber means provided between the housing and the rotatable member.

10. A tensioning device according to claim 1, wherein the operating parameter is at least one of rotational speed, temperature within the area of the belt drive and deflection of the tensioning roller means, respectively belt.

11. A tensioning device according to claim 10, wherein the operating parameter is the rotational speed during the starting and acceleration phase of the engine.

12. A tensioning device according to claim 1, wherein the actuation of the additional damping means takes place electrically, hydraulically or pneumatically.

13. A tensioning device for a belt drive on an engine, comprising a fixed member, a rotatable member rotatable with respect to the fixed member and carrying a tensioning roller means operable to rest against a belt, spring means and damping means having a damping force dependent on the operating condition operatively connected between the fixed and the rotatable member, and additional damping means between the rotatable member and one of the fixed member and the engine, said additional damping means being controllable in dependence of at least one operating parameter and being operable only at certain values of said operating parameter and wherein the additional damping means is constructed as a tensioning band means and a tensioning element, said tensioning band means surrounding the rotatable member and being provided on its inside with a friction layer and said tensioning element introducing at the ends of the tensioning band means tensioning forces necessary for the tensioning thereof.

14. A tensioning device according to claim 13, wherein the tensioning element is secured at one of a housing of the engine or a shock absorber means provided between the housing and the rotatable member.

* * * * *